(12) United States Patent
Noh

(10) Patent No.: US 7,779,968 B2
(45) Date of Patent: Aug. 24, 2010

(54) ELECTRIC PARKING BRAKE SYSTEM

(75) Inventor: Kang Sung Noh, Suwon-Si (KR)

(73) Assignee: Mando Corporation, Gyeonggi-Do (KR)

( * ) Notice: Subject to any disclaimer, the term of this patent is extended or adjusted under 35 U.S.C. 154(b) by 1105 days.

(21) Appl. No.: 11/452,681

(22) Filed: Jun. 13, 2006

(65) Prior Publication Data

US 2006/0289248 A1 Dec. 28, 2006

(30) Foreign Application Priority Data

Jun. 22, 2005 (KR) ...................... 10-2005-0054111

(51) Int. Cl.
*F16D 65/14* (2006.01)
(52) U.S. Cl. ...................... 188/2 D; 188/72.8; 188/156; 475/67; 475/269; 475/298
(58) Field of Classification Search ................. 188/2 D, 188/2 R, 72.8, 156, 162, 171, 265; 74/127, 74/383; 475/54, 56, 67, 258, 259, 269, 280, 475/298, 303
See application file for complete search history.

(56) References Cited

U.S. PATENT DOCUMENTS

| | | | | |
|---|---|---|---|---|
| 4,804,073 A | * | 2/1989 | Taig et al. ................. | 188/72.1 |
| 5,590,744 A | | 1/1997 | Belmond ................... | 188/265 |
| 6,244,394 B1 | | 6/2001 | Gutierrez et al. ............ | 188/72.8 |
| 6,305,508 B1 | * | 10/2001 | Schumann .................. | 188/72.8 |
| 6,412,610 B1 | * | 7/2002 | Drennen et al. ............. | 188/156 |
| 6,814,190 B1 | | 11/2004 | Olschewski et al. | |
| 7,337,883 B2 | * | 3/2008 | Geyer ......................... | 188/156 |
| 7,490,699 B2 | * | 2/2009 | Gil et al. ..................... | 188/2 D |
| 2004/0178028 A1 | * | 9/2004 | Farmer et al. ............... | 188/162 |
| 2007/0062769 A1 | * | 3/2007 | Noh ........................... | 188/265 |

FOREIGN PATENT DOCUMENTS

| | | |
|---|---|---|
| JP | 41-10494 | 4/1992 |
| JP | 8-295210 | 11/1996 |
| JP | 2004-215734 | 8/2004 |
| KR | 1020040108173 A | 12/2004 |

* cited by examiner

*Primary Examiner*—Pam Rodriguez
(74) *Attorney, Agent, or Firm*—McDermott Will & Emery LLP

(57) ABSTRACT

In an embodiment, an electric parking brake system is disclosed. The system may include or comprise a pair of parking cables each connected to a brake. Additionally, the system may include or comprise a motor and a drive gear. The system may also include or comprise a planetary gear unit including or comprising a sun gear connected to the drive gear, a plurality of planetary gears gearedly connected with the sun gear, an internal gear formed along a revolving path of the planetary gears, and an output carrier connected to the planetary gears. The system may further include or comprise a screw-nut unit including a screw member and a nut member screwed to the screw member, the screw-nut unit being connected to the output carrier, and the parking cables being connected to opposite ends of the screw-nut unit, respectively.

16 Claims, 5 Drawing Sheets

Prior Art

ELECTRIC PARKING BRAKE SYSTEM

CROSS-REFERENCE TO RELATED APPLICATION

This application claims the benefit of Korean Patent Application No. 2005-54111, filed on Jun. 22, 2005 in the Korean Intellectual Property Office, the disclosure of which is incorporated herein by reference.

BACKGROUND OF THE INVENTION

1. Field of the Invention

The present invention relates to a parking brake system for use in vehicles, and, more particularly, to an electric parking brake system capable of achieving efficient operation while reducing generation of noise through the use of a motor and planetary gear unit.

2. Description of the Related Art

In general, a parking brake system is an apparatus to maintain a parked vehicle in a stationary state so as not to move, and serves to hold wheels of the vehicle so as not to rotate.

FIG. 1 is a perspective view schematically showing the partial configuration of a vehicle having a conventional hand-operated parking brake system.

As shown in FIG. 1, the conventional parking brake system comprises drum brakes 21 and 22 mounted, respectively, to a pair of wheels 11 and 12, a parking lever 30 to be operated by a driver, and a pair of parking cables 41 and 42 to connect the parking lever 30 to the brakes 21 and 22, respectively.

As known in the art, each of the brakes 21 or 22 includes a drum adapted to rotate along with the associated wheel 11 or 12, a pair of brake shoes movably mounted in the drum to be selectively compressed against an inner surface of the drum, an operating lever to operate each brake shoe, and a return spring to return each brake shoe to an original position thereof.

Each of the parking cables 41 or 42 has one end connected to the operating lever of the associated brake 21 or 22 and the other end coupled to an equalizer 50 that is connected to the parking lever 30. The equalizer 50 serves to allow the same load to be applied to the left and right parking cables 41 and 42.

In the conventional parking brake system having the above described configuration, if a driver pulls the parking lever 30 upward, both the parking cables 41 and 42 are pulled simultaneously, thereby causing each operating lever of the left and right brakes 21 and 22 to push the associated brake shoe to the inner surface of the drum. Thereby, as the brake shoes are compressed against the inner surface of the drum with the above described pushing operation, a braking force is applied to the drums and wheels 11 and 12, to prevent rotation of the wheels 11 and 12.

However, the conventional hand-operated parking brake system has an inconvenience in that the driver must pull the parking lever with an appropriately regulated force and suffers from a low space utility of a vehicle compartment due to a large operating radius of the parking lever.

To solve the above described several problems of the hand-operated parking brake system, an electric parking brake designed to automatically operate brakes using a motor has been proposed and actively developed to achieve an improved operating performance, reduced operating noise, and the like.

SUMMARY OF THE INVENTION

Therefore, the present invention has been made in order to solve the above problem, and it is an aspect of the invention to provide an improved electric parking brake system capable of achieving efficient operation while reducing generation of noise through the use of a motor and planetary gear unit.

In accordance with one aspect, the present invention provides an electric parking brake system comprising a pair of parking cables each connected to a brake that is used to stop rotation of an associated wheel of a vehicle and adapted to operate the brake, and a motor to generate a driving force required to selectively operate the parking cables, further comprising: a drive gear adapted to be rotated by the motor; a planetary gear unit including a sun gear connected to the drive gear in a power transmittable manner, a plurality of planetary gears gearedly connected with the sun gear so as to revolve along a periphery of the sun gear, an internal gear formed along a revolving path of the planetary gears so as to be gearedly connected with the planetary gears, and an output carrier connected to the planetary gears in a power transmittable manner and adapted to rotate about the same rotating center as that of the sun gear; and a screw-nut unit including a screw member and a nut member screwed to the screw member to perform a relative linear movement therebetween, the screw-nut unit being connected to the output carrier in a power transmittable manner, wherein the parking cables are connected to opposite ends of the screw-nut unit, respectively, and are adapted to be operated by the relative linear movement of the screw member and nut member during rotation of the output carrier.

The screw member may include a power connecting portion penetrating through the sun gear to be coupled to the output carrier while being movably inserted through a non-circular center hole perforated through a rotating center of the output carrier, the power connecting portion having a non-circular cross section corresponding to the center hole, and a bolt portion having a plurality of male threads. The nut member may have a plurality of female threads corresponding to the male threads of the bolt portion; and the pair of parking cables are coupled to an end of the power connecting portion of the screw member and an end of the nut member, respectively.

The system may further comprise: an input gear gearedly connected with the drive gear while being integrally coupled to the sun gear to have the same rotating center as that of the sun gear, the screw member penetrating through the input gear.

The nut member may include a power connecting portion penetrating through an input gear to be coupled to the output carrier while being movably inserted through a non-circular center hole perforated through a rotating center of the output carrier, the power connecting portion having a non-circular cross section corresponding to the center hole, and a nut portion having a plurality of female threads. The screw member may have a plurality of male threads corresponding to the female threads of the nut portion. The pair of parking cables may be coupled to an end of the power connecting portion of the nut member and an end of the screw member, respectively.

The motor may include a rotary shaft having one end coupled to the drive gear and the other end provided with a release shaft used to manually rotate the drive gear.

At least one load sensor may be mounted between the screw-nut unit and at least one of the parking cables, and may be used to measure a force being applied to each parking cable by the screw nut unit.

At least one emergency release unit may be mounted between the screw-nut unit and at least one of the parking cables, and may be used to manually release a connection between the screw-nut unit and the associated parking cable.

The system may further comprise: at least one planetary reduction gear unit mounted between the plurality of planetary gears and the output carrier. The planetary reduction gear unit may include a reduction carrier connected to the plurality of planetary gears in a power transmittable manner and adapted to rotate about the same rotating center as that of the sun gear, a reduction sun gear integrally coupled to the center of the reduction carrier, and a plurality of planetary reduction gears geardly connected with the reduction sun gear and internal gear and adapted to revolve along a periphery of the reduction sun gear, the planetary reduction gears also being connected to the output carrier in a power transmittable manner.

The nut member may be integrally coupled to the center of the output carrier so as to rotate along with the output carrier. The screw member may include a first screw shaft screwed into one end of the nut member in a predetermined first spiral direction, and a second screw shaft penetrating through the sun gear to be screwed into the other end of the nut member in a predetermined second spiral direction opposite to the first spiral direction. The pair of parking cables may be connected to associated ends of the first and second screw shafts, respectively.

The system may further comprise an input gear geardly connected with the drive gear while being integrally coupled to the sun gear to have the same rotating center as that of the sun gear, the second screw shaft penetrating through the input gear.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
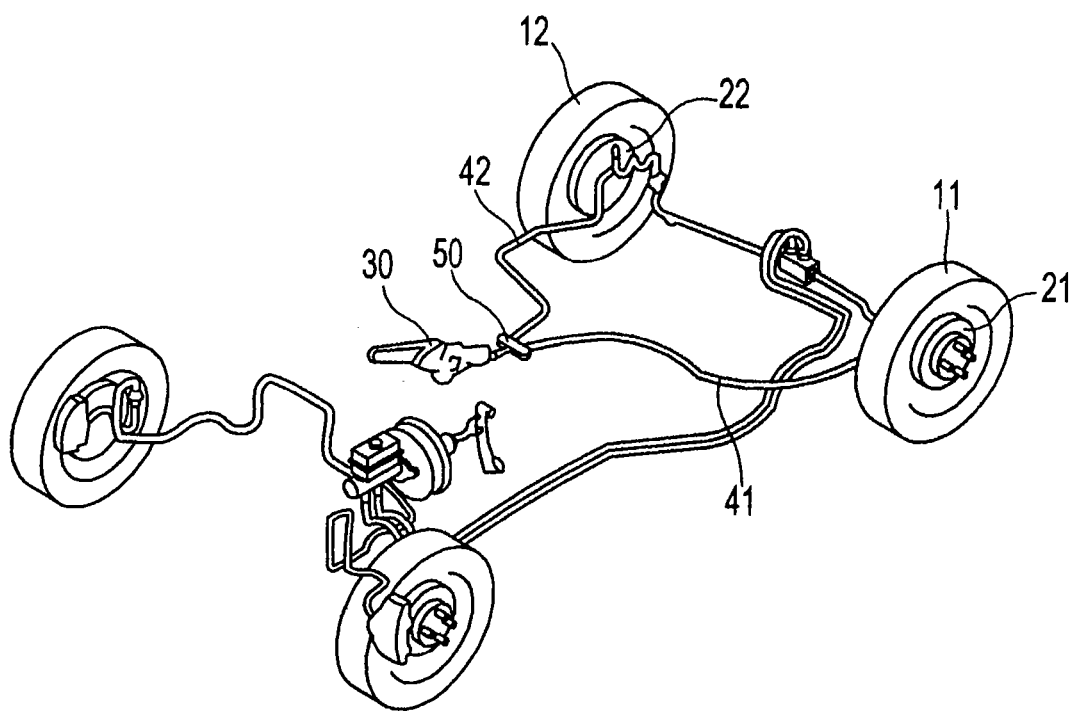
FIG. 1 is a perspective view schematically showing the partial configuration of a vehicle having a conventional parking brake system.

Reference will now be made in detail to an electric parking brake system according to preferred embodiments of the present invention, examples of which are illustrated in the accompanying drawings, wherein like reference numerals refer to like elements throughout. The embodiment is described below to explain the present invention by referring to the figures.

Figure 2:
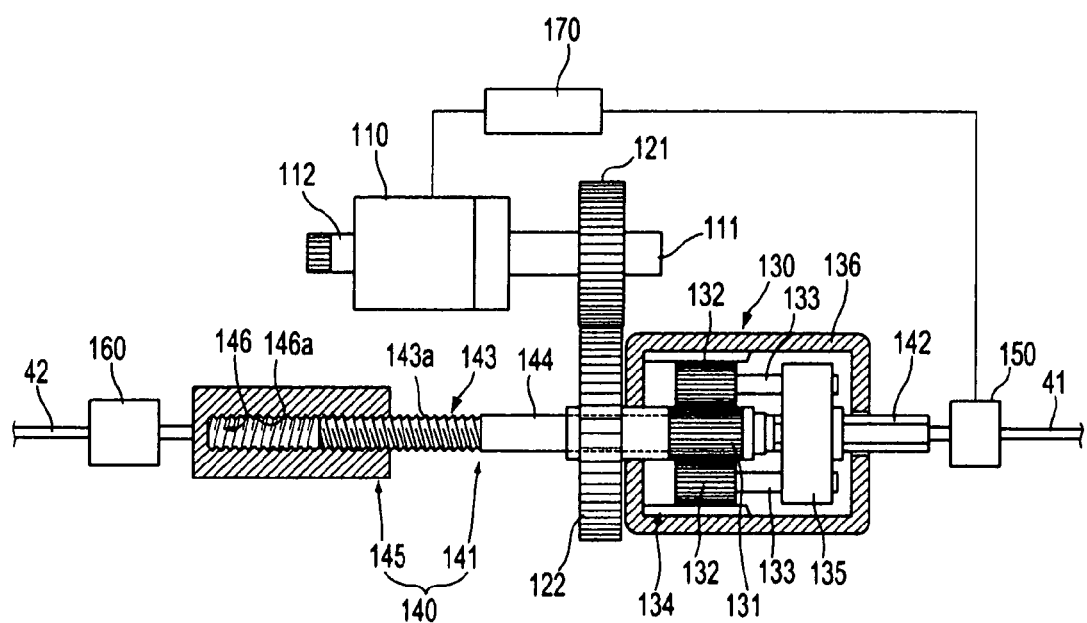
FIG. 2 is a front view schematically showing the configuration of an electric parking brake system according to a first preferred embodiment of the present invention.
Figure 3:
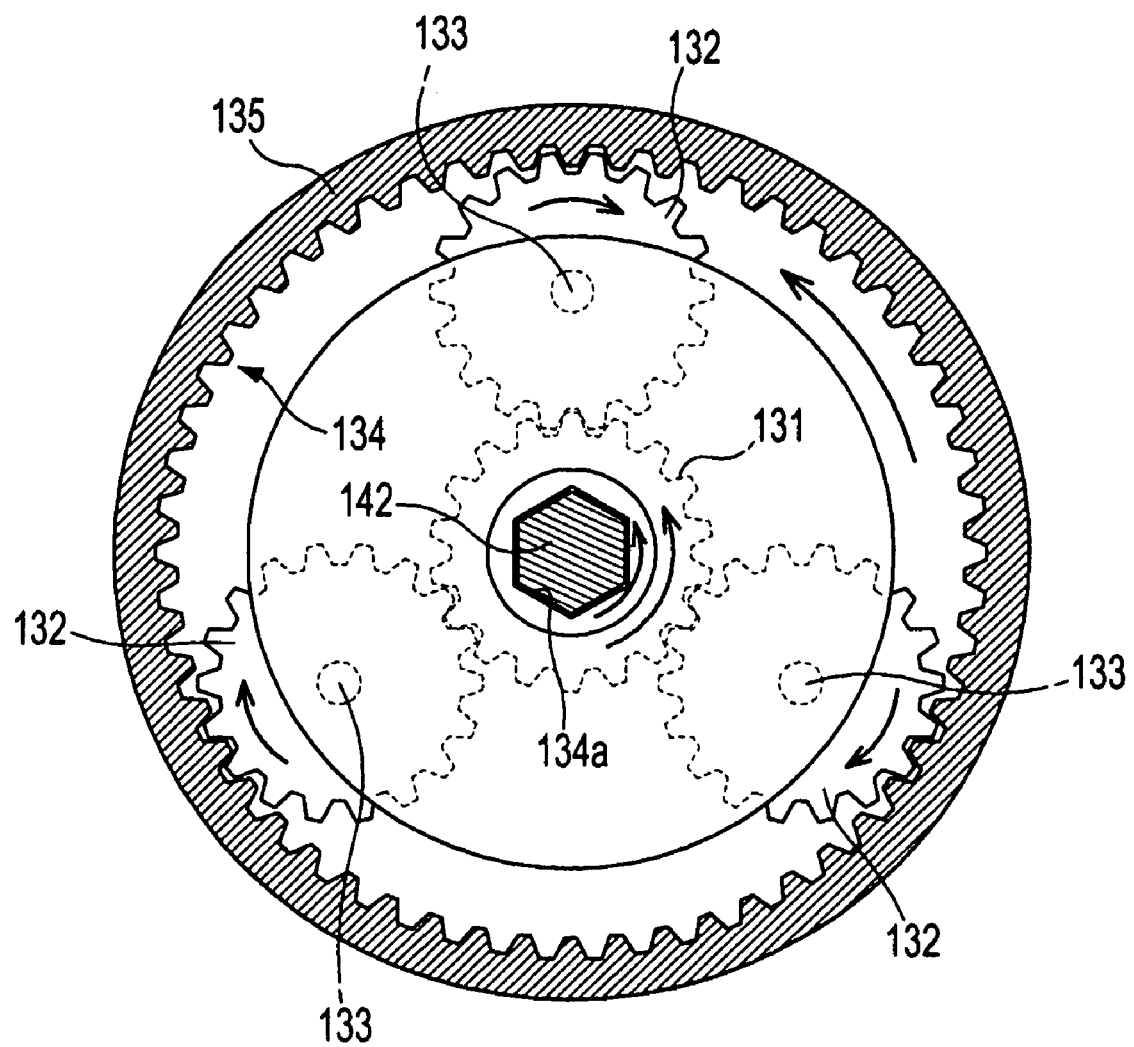
FIG. 3 is a side view showing important parts of the electric parking brake system of FIG. 2 according to the first preferred embodiment of the present invention.

FIG. 2 is a front view schematically showing the configuration of an electric parking brake system according to a first preferred embodiment of the present invention. FIG. 3 is a side view showing important parts of the electric parking brake system of FIG. 2 according to the first preferred embodiment of the present invention.

As shown in FIG. 2, the electric parking brake system according to the first preferred embodiment of the present invention comprises first and second parking cables 41 and 42 to be connected to brakes (See. reference numerals 21 and 22 of FIG. 1) that are used to stop rotation of wheels of a vehicle, a motor 110 to generate a drive force required to operate the first and second parking cables 41 and 42, a drive gear 121 coupled to the motor 110, a planetary gear unit 130 connected to the drive gear 121, a screw-nut unit 140 operatively coupled to the planetary gear unit 130, and a controller 170 to control the operation of the motor 110.

The brakes 21 and 22 and first and second parking cables 41 and 42 used to operate the brakes 21 and 22 have the same configuration and operation as those of the prior art, and detailed description thereof will be omitted.

The motor 110 is operable upon receiving power applied from an external source, and has a rotary shaft 111. The drive gear 121 is integrally coupled to one end of the rotary shaft 111. The other end of the rotary shaft 111 is provided with a release shaft 112. The release shaft 112 is used to manually operate the drive gear 121 in the case of emergency situations, for example, failure of the motor or sudden power interruption. Accordingly, if an emergency situation, such as failure of the motor, occurs, the rotary shaft 111 is manually rotated by use of separate rotating tools, so as to enable manual operation of the first and second parking cables 41 and 42 which are normally operated by the motor 110. It should be noted that the release shaft 112 may be provided at the end of the rotary shaft 111 where the drive gear 121 is also coupled, differently from that shown in FIG. 2.

The planetary gear unit 130 includes a sun gear 131 connected to the drive gear 121 in a power transmittable manner, a plurality of planetary gears 132 adapted to revolve along a periphery of the sun gear 131, an internal gear 134 formed along a revolving path of the planetary gears 132, an output carrier 135 connected to the planetary gears 132 in a power transmittable manner, and a gear housing 136 to receive the above mentioned elements 131, 132, 134, and 135. An input gear 122 is mounted to an outer surface of the gear housing 136 at a location between the drive gear 121 and the sun gear 131. The input gear 122 is geardly connected with the drive gear 121 while being integrally coupled to the sun gear 131 to have the same rotating center as that of the sun gear 131.

As shown in FIG. 3, the plurality of planetary gears 132 are equidistantly arranged such that they are geardly connected with both the sun gear 131 and the internal gear 134 fixedly mounted at an inner surface of the gear housing 136 when the sun gear 131 rotates along with the input gear (See. reference numeral 122 of FIG. 2). Although FIG. 3 illustrates three planetary gears 132, the present invention is not limited thereto, and two, four, or other number of planetary gears may be mounted. Each planetary gear 132 is centrally provided with a connecting member 133. With the use of the connecting member 133, each planetary gear 132 is connected to the output carrier 135. In this structure, at least one of connecting portions between the connecting member 133 and the planetary gear 132 and between the connecting member 133 and the output carrier 135 may exhibit a slip phenomenon.

The output carrier 135 is adapted to rotate at the same rotating speed as that of the planetary gears 132 revolving around the sun gear 131. The rotating center of the output carrier 135 coincides with that of the sun gear 131. As shown in FIG. 3, the output carrier 135 has a hexagonal center hole

134a. The center hole 134a is a portion corresponding to a power connecting portion 142 of the screw-nut unit 140 that will be explained hereinafter. Here, it should be understood that the shape of center hole 134a is not limited to the hexagonal shape, and may have a variety of non-circular shapes such as a triangular shape, square shape, and the like so long as the center hole 134a permits axial sliding movement of the power connecting portion 142 while preventing circumferential slip of the power connecting portion 142. As shown in FIG. 3, if the sun gear 131 rotates counterclockwise, the respective planetary gears 132 revolve around the sun gear 131 counterclockwise while performing a clockwise rotating motion. As a result, the output carrier 135 rotates counterclockwise at a reduced rotating speed equal to the revolving speed of the planetary gears 132.

Referring again to FIG. 2, the screw-nut unit 140 includes a screw member 141 penetrating through the input gear 122 and sun gear 131 to be coupled to the output carrier 135, and a nut member 145 screwed to the screw member 141 to perform a relative linear movement therebetween. The screw member 141 consists of the power connecting portion 142 movably inserted through the center hole 134a of the output carrier 135 while defining an end portion of the screw member 141, a bolt portion 143 defining the other end portion of the screw member 141 opposite to the power connecting portion 142 and externally formed with a plurality of male threads 143a, and a slip portion 144 interposed between the power connecting portion 142 and the bolt portion 143.

As will be understood from FIG. 3, the power connecting portion 142 has a hexagonal cross section corresponding to that of the center hole 134a of the output carrier 135. Similar to the center hole 134a, the cross section of the power connecting portion 142 is not limited to the hexagonal cross section, and may have a variety of non-circular cross sections such as a triangular cross section, square cross section, and the like so long as the power connecting portion 142 is axially slidable through the center hole 134a without the risk of circumferential slip thereof.

The slip portion 144 has a circular cross section, to permit easy circumferential slip thereof when being inserted into the input gear 122 and sun gear 131.

The nut member 145 has a nut portion 146 internally formed with a plurality of female threads 146a corresponding to the male threads 143a of the screw member 141. Thereby, the bolt portion 143 of the screw member 141 is able to be screwed to the nut portion 146 such that the bolt portion 143 is further inserted into or released from the nut portion 146 in accordance with rotation of the screw member 141. With such a relative linear movement between the nut member 145 and screw member 141, the overall length of the screw-nut unit 140 from a left end of the nut member 145 to a right end of the screw member 141, more particularly, a right end of the power connecting portion 142 of the screw member 141, is variable. Here, the terms "right" and "left" are designated based on the right and left sides of the drawing.

The right end of the power connecting portion 142 of the screw member 141 is connected to the first parking cable 41, whereas the left end of the nut member 145 is connected to the second parking cable 42. In this structure, a load sensor 150 is mounted between the power connecting portion 142 and the first parking cable 41. Also, an emergency release unit 160 is mounted between the nut member 145 and the second parking cable 42.

The load sensor 150 is used to measure forces applied to the respective parking cables 41 and 42 during the operation of the screw-nut unit 140 and to send the measured values to the controller 170.

The emergency release unit 160 has the same function as that of the release shaft 112 of the motor 110. That is, the emergency release unit 160 is used to remove the forces acting between the screw-nut unit 140 and the first and second parking cables 41 and 42 in the cases of emergency situations, for example, failure of elements or power interruption. If the emergency situation occurs, the emergency release unit 160 is manually operated by the driver to separate the second parking cable 42 from the nut member 145, so as to remove the forces being applied to the first and second parking cables 41 and 42. As the emergency release unit 160, a variety of fasteners such as a turn-buckle, shackle, clip, and the like are usable. Here, it should be understood that the mounting positions of the load sensor 150 and emergency release unit 160 are changeable.

The controller 170 serves to control a variety of motions of the motor 110, such as operation starting and stopping motions, forward and reverse rotating motions, and the like, based on driver's commands and signal transmitted from the load sensor 150. For example, the controller 170 is able to rotate the motor 110 forward or reverse if a brake operating command or brake release command is applied thereto by the driver. Also, the controller 170 is able to stop the operation of the motor 110 based on the signals from the load sensor 150 if the forces being applied to the first and second parking cables 41 and 42 exceed a predetermined level.

Now, the operating principle of the electric parking brake system according to the first preferred embodiment of the present invention having the above described configuration will be explained.

If a brake operating command is applied to the motor 110 via the controller 170, the motor 110 rotates in a predetermined direction, for example, in a forward direction. Thereby, in accordance with rotation of the rotary shaft 111 of the motor 110, the drive gear 121 acts to rotate the input gear 122, and subsequently, to rotate the sun gear 131 and the plurality of planetary gears 132 of the planetary gear unit 130. As the planetary gears 132 rotate, the output carrier 135 rotates at a reduced rotating speed equal to a revolving speed of the planetary gears 132. In cooperation with the planetary gear unit 130, simultaneously, the screw member 141 rotates, causing the bolt portion 143 of the screw member 141 to be inserted into the nut portion 146 of the nut member 145. This insertion operation causes the first and second parking cables 41 and 42 to be pulled tightly. As a result, on the basis of operation of the first and second parking cables 41 and 42, the respective brakes 21 and 22 are operated to apply a braking force to the wheels 11 and 12, so as to prevent rotation of the wheels 11 and 12. Furthermore, if the first and second parking cables 41 and 42 are continuously pulled so as to be excessively pulled beyond a predetermined level, the load sensor 150 outputs corresponding signals to the controller 170, so as to stop the operation of the motor 110 by the controller 170.

Conversely, if a brake release command is applied to the motor 110 via the controller 170, the motor 110 rotates in a predetermined direction, for example, in a reverse direction. A driving force of the motor 110 is transmitted to the output carrier 135 via the drive gear 121, input gear 122, sun gear 131 and the plurality of planetary gears 132, to rotate the output carrier 135. Simultaneously with rotation of the output carrier 135, the screw member 141 rotates reversely, causing the bolt portion 143 of the screw member 141 to be released from the nut portion 146 of the nut member 145. This release operation acts to remove pulling forces being applied to the first and second parking cables 41 and 42. As a result, the respective parking cables 41 and 42 are returned to the associated brakes 21 and 22 by the elasticity of return springs provided in the respective brakes 21 and 22, and thus, braking forces being applied to the wheels 11 and 12 are removed.

As will be understood from the above description, the electric parking brake system according to the first embodiment of the present invention has the effect of achieving efficient operation and reduced generation of noise through the use of the planetary gear unit.

Figure 4:
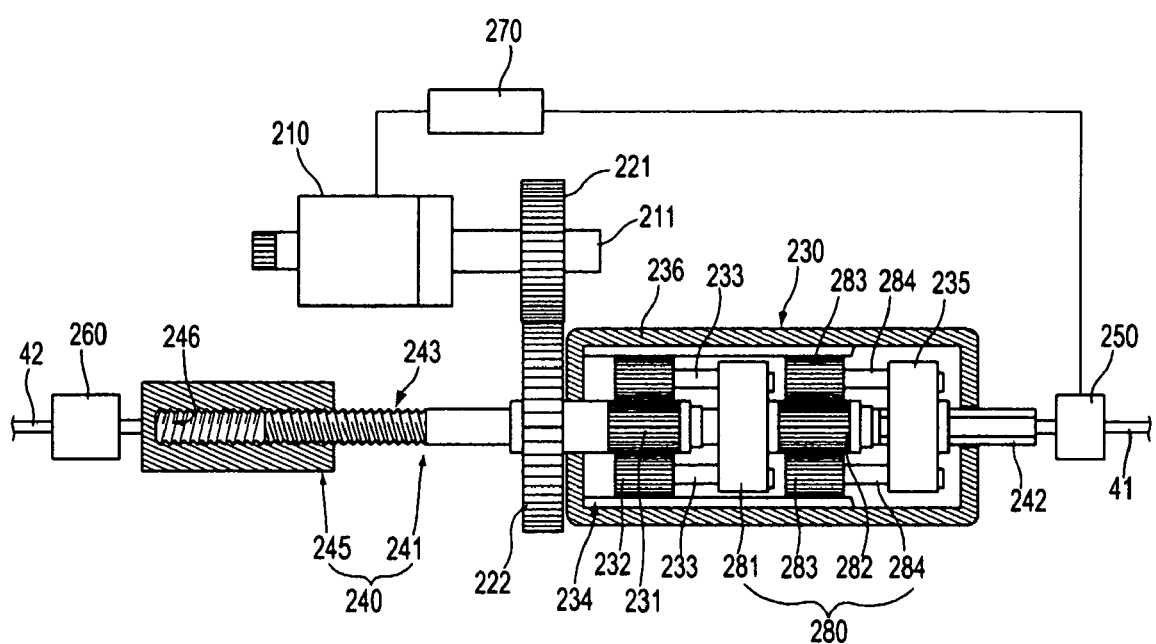
FIG. 4 is a front view schematically showing the configuration of an electric parking brake system according to a second preferred embodiment of the present invention.

Meanwhile, FIG. 4 is a front view schematically showing the configuration of an electric parking brake system according to a second preferred embodiment of the present invention.

As shown in FIG. 4, the electric parking brake system according to the second embodiment of the present invention has approximately the same configuration as that of the above described first embodiment except for a planetary gear unit 230 including at least one planetary reduction gear unit 280.

Specifically, the electric parking brake system of the present embodiment comprises a motor 210 having a rotary shaft 211, a drive gear 221 coupled to the rotary shaft 211, a planetary gear unit 230 connected to the drive gear 221 via an input gear 222, a screw-nut unit 240 consisting of a screw member 241 and nut member 245, first and second parking cables 41 and 42 connected to associated ends of the screw member 241 and nut member 245 and adapted to operate the brakes (See. reference numerals 21 and 22 of FIG. 1), a load sensor 250 mounted between the screw member 241 and the first parking cable 41, an emergency release unit 260 mounted between the nut member 245 and the second parking cable 42, and a controller 270 to control the motor 210.

The planetary gear unit 230 includes a sun gear 231 integrally coupled to the input gear 222, a plurality of planetary gears 232 adapted to revolve along a periphery of the sun gear 231, an internal gear 234 formed along a revolving path of the planetary gears 232, an output carrier 235 connected to the planetary gears 232 in a power transmittable manner, a planetary reduction gear unit 280 mounted between the plurality of planetary gears 232 and the output carrier 235, and a gear housing 236 to receive the above mentioned elements 231, 232, 235, and 280 while being integrally formed with the internal gear 234.

The planetary reduction gear unit 280 includes a reduction carrier 281 connected to each planetary gear 232 via a connecting member 233. The reduction carrier 281 has the same rotating center as that of the sun gear 231, and is adapted to rotate at a rotating speed equal to a revolving speed of the plurality of planetary gears 232. The planetary reduction gear unit 280 further includes a reduction sun gear 282 integrally coupled to the center of the reduction carrier 281, and a plurality of planetary reduction gears 283 gearedly connected with the reduction sun gear 282 and internal gear 234, simultaneously, and adapted to revolve along a periphery of the reduction sun gear 282, each planetary reduction gear 283 being connected to the output carrier 235 via a connecting member 284. In association with the planetary reduction gear unit 280, it should be understood that a plurality of planetary reduction gear units 280 may be mounted as occasion demands.

The screw member 241 has a power connecting portion 242, which penetrates through the input gear 222, sun gear 231, reduction carrier 281, reduction sun gear 282, and output carrier 235 to thereby be coupled to the output carrier 235.

The remaining configuration of the present embodiment is the same as that of the electric parking brake system of the first embodiment, and thus, detailed description thereof will be omitted.

Also, the operating principle of the electric parking brake system of the present embodiment is approximately the same as that of the first embodiment. Hereinafter, only differences between the operating principles of the two electric parking brake systems according to the first and second embodiments will be described.

If an operating command is applied via the controller 270, the motor 210 rotates forward or reverse. A driving force of the motor 210 is transmitted to the sun gear 231 via the rotary shaft 211, drive gear 221, and input gear 222. Then, in accordance with rotation of the sun gear 231, the plurality of planetary gears 232 revolve along the periphery of the sun gear 231, thereby causing the reduction carrier 281 to rotate at a rotating speed equal to the revolving speed of the planetary gears 232. Simultaneously with rotation of the reduction carrier 281, the reduction sun gear 282 rotates. Also, the plurality of planetary reduction gears 283 revolve along the periphery of the reduction sun gear 282, causing the output carrier 235 to rotate at a rotating speed equal to a revolving speed of the planetary reduction gears 283.

If the screw member 241 rotates simultaneously with rotation of the output carrier 235, the overall length of the screw-nut unit 240 from a right end of the screw member 241 to a left end of the nut member 245 varies as a result of a relative linear movement between the bolt portion 243 of the screw member 241 and the nut portion 246 of the nut member 245. Such a variation of length causes a certain pulling force to be applied to the first and second parking cables 41 and 42 or to be removed.

The electric parking brake system according to the present embodiment having the above described configuration has the effect of achieving more efficient operation and reduced generation of noise as compared to that of the first embodiment by allowing a reduced driving force to be transmitted to the output carrier 235.

Although not shown in the drawings related to the above described two embodiments, the mounting positions of the screw member and nut member may be changed. For example, in an alternative embodiment, the nut member may consist of a power connecting portion formed at one end thereof to be connected to the first parking cable, a nut portion formed at the other end thereof opposite to the power connecting portion, and a slip portion interposed between the power connecting portion and nut portion, whereas the screw member may have a bolt portion screwed to the nut portion. In this case, the nut member may be coupled to the output carrier, and the screw member may be connected to the second parking cable.

In the above described alternative embodiment, although the nut member rotates in accordance with rotation of the output carrier, the nut portion of the nut member and the bolt portion of the screw member still have a relative linear movement, and therefore, can achieve the same effect as that of the above described embodiments.

Figure 5:
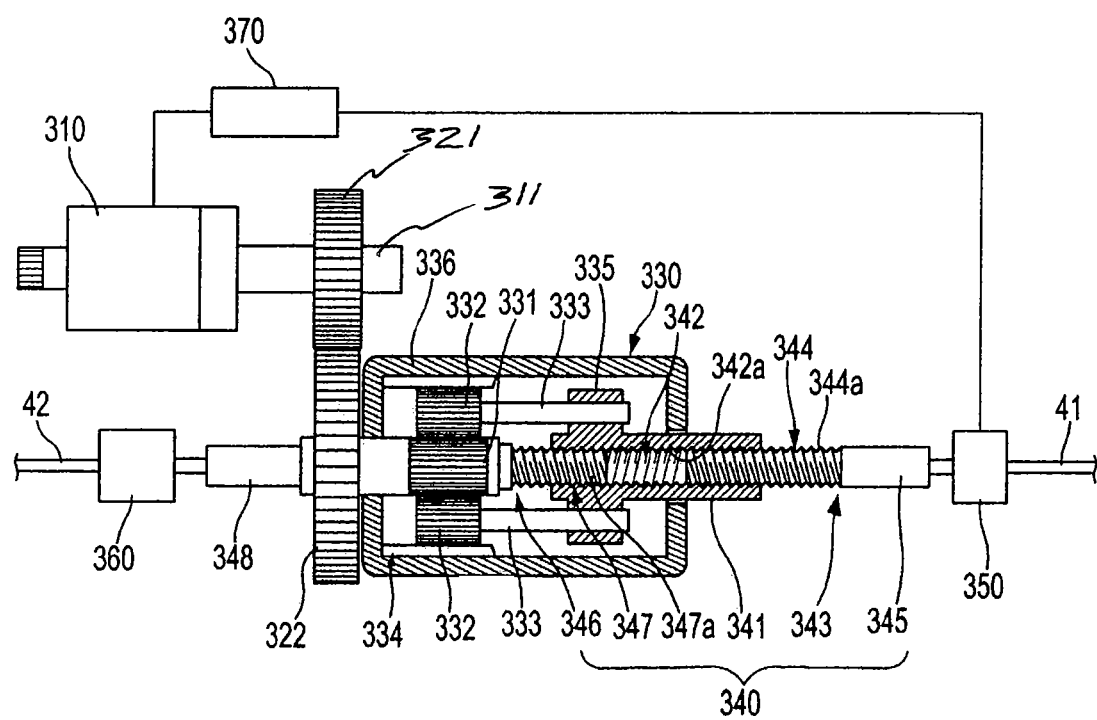
FIG. 5 is a front view schematically showing the configuration of an electric parking brake system according to a third preferred embodiment of the present invention.

FIG. 5 is a front view schematically showing the configuration of an electric parking brake system according to a third preferred embodiment of the present invention.

As shown in FIG. 5, the electric parking brake system according to the third embodiment of the present invention has approximately the same configuration as that of the first embodiment except for the partial configuration of a planetary gear unit 330 and screw-nut unit 340 coupled to each other.

Specifically, the electric parking brake system of the present embodiment comprises a motor 310 having a rotary shaft 311, a drive gear 321 coupled to the rotary shaft 311, a planetary gear unit 330 connected to the drive gear 321 via an input gear 322, a screw-nut unit 340 coupled to the planetary gear unit 330, first and second parking cables 41 and 42 connected to opposite ends of the screw-nut unit 340 and adapted to operate the brakes (See. reference numerals 21 and 22 of FIG. 1), a load sensor 350 mounted between the screw-nut unit 340 and the first parking cable 41, an emergency release unit 360 mounted between the screw-nut unit 340 and the second parking cable 42, and a controller 370 to control the motor 310.

The planetary gear unit 330 includes a sun gear 331 integrally coupled to the input gear 322, a plurality of planetary gears 332 adapted to revolve along a periphery of the sun gear 331, an internal gear 334 formed along a revolving path of the planetary gears 332, an output carrier 335 coupled to each planetary gear 332 via a connecting member 333 and adapted to rotate about the same rotating center as that of the sun gear 331, and a gear housing 336 to receive the above mentioned elements 331, 332, and 335 while being integrally formed with the internal gear 334.

The screw-nut unit 340 includes a nut member 341 integrally coupled to the center of the output carrier 335 to rotate along with the output carrier 335, a first screw shaft 343 inserted in one end of the nut member 341 to be inserted into or released from the nut member 341, and a second screw shaft 346 inserted in the other end of the nut member 341 to be inserted into or released from the nut member 341.

The nut member 341 takes the form of a hollow shaft, and has a nut portion 342 internally formed with a plurality of female threads 342a.

The first screw shaft 343 consists of a bolt portion 344 externally formed with a plurality of male threads 344a having a predetermined spiral direction, and a slip portion 345 extended from the bolt portion 344. The bolt portion 344 of the first screw shaft 343 is screwed to the nut portion 342 of the nut member 341 in a predetermined spiral direction. Also, the slip portion 345 is connected, at an end thereof, to the first parking cable 41. In an alternative configuration, the slip portion 345 of the first screw shaft 343 may be omitted. In this case, the first parking cable 41 is directly connected to an end of the bolt portion 344.

The second screw shaft 346 consists of a bolt portion 347 externally formed with a plurality of male threads 347a having a predetermined spiral direction opposite to that of the male threads 344a of the first screw shaft 343, and a slip portion 348 extended from the bolt portion 347 to penetrate through the sun gear 331 and input gear 322. The bolt portion 347 of the second screw shaft 346 is screwed to the nut portion 342 in a predetermined spiral direction opposite to that of the first screw shaft 343. Also, the slip portion 348 is connected, at an end thereof, to the second parking cable 42. The slip portion 348 has a circumferential slip motion while being inserted through the sun gear 331 and input gear 322.

If the nut member 341 rotates in accordance with rotation of the output carrier 335, the first and second screw shafts 343 and 346 may be simultaneously inserted into or released from the nut member 341.

The remaining configuration of the present embodiment is equal to that of the electric parking brake systems of the above described embodiments, and thus, detailed description thereof will be omitted.

Hereinafter, the operating principle of the electric parking brake system according to the third embodiment of the present invention having the above described configuration will be explained. The following description will be based on a difference between the operating principles of the above described electric parking brake systems according to the first and third embodiments, except for the identical features therebetween.

If a driver's operating command is applied via the controller 370, the motor 310 rotates forward or reverse. A driving force of the motor 310 is transmitted to the sun gear 331 via the rotary shaft 311, drive gear 321, and input gear 322. Then, in accordance with rotation of the sun gear 331, the plurality of planetary gears 332 revolve along the periphery of the sun gear 331, thereby causing the output carrier 335 to rotate at a rotating speed equal to a revolving speed of the planetary gears 332. Simultaneously with rotation of the output carrier 335, the nut member 341 rotates at the same speed and direction as those of the output carrier 335.

In this case, if the command applied to the controller 370 is a brake operating command, the bolt portions 344 and 347 of the first and second screw shafts 343 and 346 are simultaneously inserted deeply into the nut portion 342 of the nut member 341. Thereby, the screw shafts 343 and 346 act to pull the first and second parking cables 41 and 42 connected to the associated ends thereof.

Conversely, if the command applied to the controller 370 is a brake release command, the motor 310 and nut member 341 have a rotating motion opposite to that of the brake operating command. Thereby, the bolt portions 344 and 347 of the first and second screw shafts 343 and 346, which were deeply inserted into the nut portion 342 of the nut member 341, are released from the nut portion 342, thereby acting to remove the pulling forces being applied to the first and second parking cables 41 and 42.

Similarly, the electric parking brake system according to the third embodiment of the present invention has the effect of achieving efficient operation and reduced generation of noise through the use of the planetary gear unit.

As apparent from the above description, in the electric parking brake system of the present invention, through the use of a planetary gear unit having a low frictional loss and high power transmission efficiency based on uniform distribution of load transmitted thereto, efficient operation and reduced generation of noise can be accomplished.

An electric parking brake system capable of achieving efficient operation while reducing generation of noise. The electric parking brake system comprises first and second parking cables to be connected to brakes that are used to stop rotation of wheels of a vehicle, a motor to generate a drive force required to selectively operate the parking cables, a drive gear adapted to rotate in accordance with operation of the motor, a planetary gear unit, and a screw-nut unit. The planetary gear unit includes a sun gear connected to the drive gear in a power transmittable manner, a plurality of planetary gears gearedly connected with the sun gear and adapted to revolve along a periphery of the sun gear, an internal gear formed along a revolving path of the planetary gears and adapted to be gearedly connected with the planetary gears, and an output carrier connected to the planetary gears in a power transmittable manner and adapted to rotate about the same rotating center as that of the sun gear. The screw-nut unit includes a screw member and a nut member screwed to the screw member to perform a relative linear movement. The screw-nut unit is coupled to the output carrier in a power transmittable manner. The parking cables are connected to opposite ends of the screw-nut unit, respectively, and are adapted to be operated by the relative linear movement of the screw member and nut member during rotation of the output carrier.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electric parking brake system comprising a pair of parking cables each connected to a brake that is used to stop rotation of an associated wheel of a vehicle and adapted to operate the brake, and a motor to generate a driving force required to selectively operate the parking cables, further comprising:
   a drive gear adapted to be rotated by the motor;
   a planetary gear unit including a sun gear connected to the drive gear in a power transmittable manner, a plurality of planetary gears gearedly connected with the sun gear so as to revolve along a periphery of the sun gear, an internal gear formed along a revolving path of the planetary gears so as to be gearedly connected with the planetary gears, and an output carrier connected to the planetary gears in a power transmittable manner and adapted to rotate about the same rotating center as that of the sun gear; and
   a screw-nut unit including a screw member and a nut member screwed to the screw member to perform a relative linear movement therebetween, the screw-nut unit being connected to the output carrier in a power transmittable manner,
   wherein the parking cables are connected to opposite ends of the screw-nut unit, respectively, and are adapted to be operated by the relative linear movement of the screw member and nut member during rotation of the output carrier;
   wherein the screw member includes a power connecting portion penetrating through the sun gear to be coupled to the output carrier while being movably inserted through a non-circular center hole perforated through a rotating center of the output carrier, the power connecting portion having a non-circular cross section corresponding to the center hole, and a bolt portion having a plurality of male threads;
   wherein the nut member has a plurality of female threads corresponding to the male threads of the bolt portion; and
   wherein the pair of parking cables are coupled to an end of the power connecting portion of the screw member and an end of the nut member, respectively.

2. The system according to claim 1, further comprising:
   an input gear gearedly connected with the drive gear while being integrally coupled to the sun gear to have the same rotating center as that of the sun gear, the screw member penetrating through the input gear.

3. The system according to claim 1, wherein:
   the nut member includes a power connecting portion penetrating through an input gear to be coupled to the output carrier while being movably inserted through a non-circular center hole perforated through a rotating center of the output carrier, the power connecting portion having a non-circular cross section corresponding to the center hole, and a nut portion having a plurality of female threads;
   the screw member has a plurality of male threads corresponding to the female threads of the nut portion; and
   the pair of parking cables are coupled to an end of the power connecting portion of the nut member and an end of the screw member, respectively.

4. The system according to claim 3, further comprising:
   an input gear gearedly connected with the drive gear while being integrally coupled to the sun gear to have the same rotating center as that of the sun gear, the nut member penetrating through the input gear.

5. The system according to claim 1, wherein the motor includes a rotary shaft having one end coupled to the drive gear and the other end provided with a release shaft used to manually rotate the drive gear.

6. The system according to claim 1, wherein at least one load sensor is mounted between the screw-nut unit and at least one of the parking cables, and is used to measure a force being applied to each parking cable by the screw nut unit.

7. The system according to claim 1, wherein at least one emergency release unit is mounted between the screw-nut unit and at least one of the parking cables, and is used to manually release a connection between the screw-nut unit and the associated parking cable.

8. The system according to claim 1, further comprising:
   at least one planetary reduction gear unit mounted between the plurality of planetary gears and the output carrier,
   wherein the planetary reduction gear unit includes a reduction carrier connected to the plurality of planetary gears in a power transmittable manner and adapted to rotate about the same rotating center as that of the sun gear, a reduction sun gear integrally coupled to the center of the reduction carrier, and a plurality of planetary reduction gears gearedly connected with the reduction sun gear and internal gear and adapted to revolve along a periphery of the reduction sun gear, the planetary reduction gears also being connected to the output carrier in a power transmittable manner.

9. The system according to claim 8, wherein the screw member includes a power connecting portion penetrating through the input gear, reduction carrier, and reduction sun gear to be coupled to the output carrier while being movably inserted through a non-circular center hole perforated through a rotating center of the output carrier, the power connecting portion having a non-circular cross section corresponding to the center hole, and a bolt portion having a plurality of male threads;
   the nut member has a plurality of female threads corresponding to the male threads of the bolt portion; and
   the pair of parking cables are coupled to an end of the power connecting portion of the screw member and an end of the nut member, respectively.

10. The system according to claim 9, further comprising:
    an input gear gearedly connected with the drive gear while being integrally coupled to the sun gear to have the same rotating center as that of the sun gear, the screw member penetrating through the input gear.

11. The system according to claim 8, wherein the nut member includes a power connecting portion penetrating through the input gear, reduction carrier, and reduction sun gear to be coupled to the output carrier while being movably inserted through a non-circular center hole perforated through a rotating center of the output carrier, the power connecting portion having a non-circular cross section corresponding to the center hole, and a bolt portion having a plurality of female threads;
    the screw member has a plurality of male threads corresponding to the female threads of the nut portion; and
    the pair of parking cables are coupled to an end of the power connecting portion of the nut member and an end of the screw member, respectively.

12. The system according to claim 11, further comprising:
    an input gear gearedly connected with the drive gear while being integrally coupled to the sun gear to have the same rotating center as that of the sun gear, the nut member penetrating through the input gear.

13. The system according to claim 1, wherein:

the nut member is integrally coupled to the center of the output carrier so as to rotate along with the output carrier;

the screw-member includes a first screw shaft screwed into one end of the nut member in a predetermined first spiral direction, and a second screw shaft penetrating through the sun gear to be screwed into the other end of the nut member in a predetermined second spiral direction opposite to the first spiral direction; and the pair of parking cables are connected to associated ends of the first and second screw shafts, respectively.

14. The system according to claim 13, further comprising:

an input gear geared ly connected with the drive gear while being integrally coupled to the sun gear to have the same rotating center as that of the sun gear, the second screw shaft penetrating through the input gear.

15. An electric parking brake system comprising a pair of parking cables each connected to a brake that is used to stop rotation of an associated wheel of a vehicle and adapted to operate the brake, and a motor to generate a driving force required to selectively operate the parking cables, further comprising:

a drive gear adapted to be rotated by the motor;

a planetary gear unit including a sun gear connected to the drive gear in a power transmittable manner, a plurality of planetary gears geared ly connected with the sun gear so as to revolve along a periphery of the sun gear, an internal gear formed along a revolving path of the planetary gears so as to be geared ly connected with the planetary gears, and an output carrier connected to the planetary gears in a power transmittable manner and adapted to rotate about the same rotating center as that of the sun gear; and a screw-nut unit including a screw member and a nut member screwed to the screw member to perform a relative linear movement therebetween, the screw-nut unit being connected to the output carrier in a power transmittable manner, wherein the parking cables are connected to opposite ends of the screw-nut unit, respectively, and are adapted to be operated by the relative linear movement of the screw member and nut member during rotation of the output carrier;

wherein the nut member includes a power connecting portion penetrating through an input gear to be coupled to the output carrier while being movably inserted through a non-circular center hole perforated through a rotating center of the output carrier, the power connecting portion having a non-circular cross section corresponding to the center hole, and a nut portion having a plurality of female threads;

wherein the screw member has a plurality of male threads corresponding to the female threads of the nut portion; and wherein the pair of parking cables are coupled to an end of the power connecting portion of the nut member and an end of the screw member, respectively.

16. The system according to claim 15, further comprising:

an input gear geared ly connected with the drive gear while being integrally coupled to the sun gear to have the same rotating center as that of the sun gear, the nut member penetrating through the input gear.

* * * * *